(12) United States Patent
Birth

(10) Patent No.: US 6,901,114 B2
(45) Date of Patent: May 31, 2005

(54) TRANSMITTER AND METHOD OF GENERATING A TRANSMISSION SIGNAL

(75) Inventor: Winfrid Birth, Veitsbronn (DE)

(73) Assignee: Koninklijke Philips Electronics N.V., Eindhoven (NL)

(*) Notice: Subject to any disclaimer, the term of this patent is extended or adjusted under 35 U.S.C. 154(b) by 737 days.

(21) Appl. No.: 09/801,624

(22) Filed: Mar. 8, 2001

(65) Prior Publication Data

US 2001/0038671 A1 Nov. 8, 2001

(30) Foreign Application Priority Data

Mar. 11, 2000 (DE) .......................................... 100 12 003

(51) Int. Cl.[7] .......................... H04K 1/02; H04L 25/03; H04L 25/49
(52) U.S. Cl. ...................................... 375/296; 375/285
(58) Field of Search .............................. 375/227, 259, 375/260, 261, 278, 279, 284, 285, 295, 296, 298, 303, 308

(56) References Cited

U.S. PATENT DOCUMENTS 3,898,566 A * 8/1975 Switzer et al. ............. 455/3.03
5,172,072 A * 12/1992 Willems et al. ............. 330/149
5,579,404 A * 11/1996 Fielder et al. .............. 381/106
5,786,724 A * 7/1998 Teggatz ...................... 327/534

FOREIGN PATENT DOCUMENTS

JP        6120990        6/1994   ........... H04L/27/20

* cited by examiner

Primary Examiner—Jean B. Corrielus
(74) Attorney, Agent, or Firm—Aaron Waxler

(57) ABSTRACT

The invention relates to a transmitter and a method of generating a transmission signal, which transmitter includes a modulation device for generating two uncompensated transmission signals Y, Z by respective modulation of at least one baseband signal I, Q with an oscillation signal $X_{LOQ}$, $X_{LOI}$, the two uncompensated transmission signals Y, Z containing at least one respective interference component, which interference components are phase shifted by a given amount relative to one another. These interference components are eliminated by a compensation circuit that includes an all-pass. The all-pass rotates the phase of the interference component to be eliminated in one of the uncompensated transmission signals to overall a phase difference of 180° relative to the phase of the corresponding interference component in the other uncompensated transmission signal. The compensation of the interference component is realized by addition of the output signal of the first all-pass and the other uncompensated transmission signal.

5 Claims, 5 Drawing Sheets

TRANSMITTER AND METHOD OF GENERATING A TRANSMISSION SIGNAL

The invention relates to a transmitter and a method for generating a transmission signal, which transmitter includes a modulation device for generating at least two uncompensated transmission signals by modulation of a baseband signal with a respective oscillation signal, each of said two uncompensated transmission signals comprising at least one interference component and the interference components in the two uncompensated transmission signals being phase shifted relative to one another by a given amount.

From the present state of the art it is generally known to prepare transmission signals by using quadrature modulators.

Figure 6:
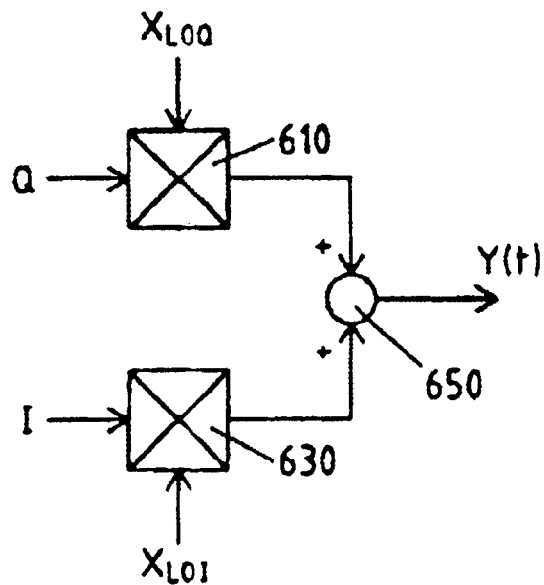

FIG. 6 shows a first embodiment of such a known quadrature modulator. The quadrature modulator includes two modulators 610, 630 which multiply a respective baseband signal I, Q by an associated oscillation signal $X_{LOQ}$, $X_{LOI}$. The output signals of the two modulators 610, 630 are applied to an adding device 650 which additively combines the output signals of the modulators so as to present an uncompensated transmission signal Y(t) on its output.

The transmission signal Y is uncompensated in a sense that, notably when binary oscillation signals $X_{LOQ}$, $X_{LOI}$ are used, it includes interference components which are undesirable in the spectrum of the transmission signal. The appearance of such interference components in the context of the generating of the uncompensated transmission signal by the quadrature modulator will be mathematically illustrated hereinafter.

Figure 7:
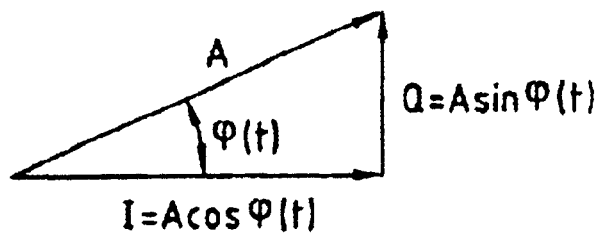

As is shown in FIG. 7, the baseband signals I, Q may be interpreted as cartesian components of a rotating pointer A. For the special case where $\psi(t)=\omega_m \cdot t$, the following mathematical expressions are obtained for the baseband signals I and Q:

$$I = A\cos\psi = A\cos(\omega_m t) \quad (1)$$

$$Q = A\sin\psi = A\sin(\omega_m t) \quad (2)$$

Figure 8:
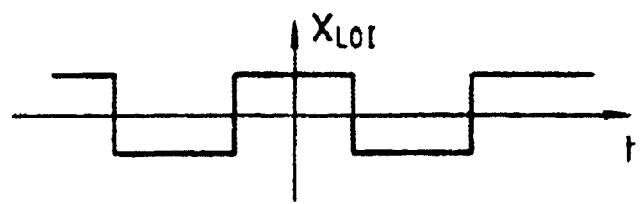
Figure 8:
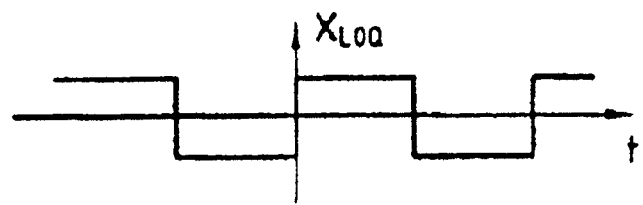

Binary signals which have been phase shifted 90° relative to one another as shown in FIG. 8 are typically used as oscillation signals $X_{LOI}$ and $X_{LOQ}$. The following series representation is obtained by Fourier transformation of the signals:

$$X_{LOI} = \cos\omega_c t - \frac{1}{3}\cos 3\omega_c t + \frac{1}{5}\cos 5\omega_c t - \frac{1}{7}\cos 7\omega_c t \quad (3)$$

$$X_{LOQ} = \sin\omega_c t + \frac{1}{3}\sin 3\omega_c t + \frac{1}{5}\sin 5\omega_c t + \frac{1}{7}\sin 7\omega_c t \quad (4)$$

The described combination of the baseband signals I, Q with the oscillation signals $X_{LOQ}$, $X_{LOI}$ in the quadrature modulator results in the following representation of the first uncompensated transmission signal Y:

$$Y(t) = X_{LOI} \cdot \cos\omega_m t(\pm) X_{LOQ} \cdot \sin\omega_m t \text{ for } A=1 \quad (5a)$$

The use of the Fourier series representation for the oscillation signals $X_{LOI}$ and $X_{LOQ}$ and the subsequent multiplication results in the following series representation for the first uncompensated transmission signal:

$$Y(t) = \cos(\omega_c \overline{(+)} \omega_m)t - \quad (5b)$$
$$\frac{1}{3}\cos(3\omega_c(\overset{+}{-})\omega_m)t + \frac{1}{5}\cos(5\omega_c \overline{(+)} \omega_m)t -$$
$$\frac{1}{7}\cos(7\omega_c(\overset{+}{-})\omega_m)t$$

In this representation the fundamental wave, that is, the summand $\cos(\omega_c -/+\omega_m)t$, represents the desired component in the transmission signal Y(t) and all other components constitute undesirable interference components in the transmission signal Y(t).

The reference $\omega_c$ in the equations 3 to 5 represents the carrier frequency and $\omega_m$ represents the modulation frequency.

Figure 9:
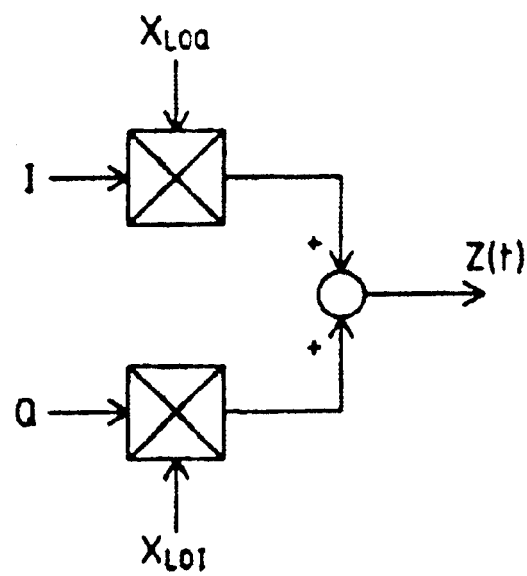

FIG. 9 shows an alternative embodiment of the previously described quadrature modulator. The hardware construction of the alternative known quadrature modulator is identical to that of the quadrature modulator shown in FIG. 6. The only difference between the two quadrature modulators consists in their control in a sense that in the alternative quadrature modulator the baseband signal I is multiplied by the oscillation signal $X_{LOQ}$ instead of the oscillation signal $X_{LOI}$. Analogously, the baseband signal Q is not multiplied by the oscillation signal $X_{LOQ}$ but by the oscillation signal $X_{LOI}$.

When the signals described in the equations 1 to 4 are used, a second uncompensated transmission signal Z(t) appears on the output of the alternative quadrature modulator shown in FIG. 9; this second transmission signal can be mathematically expressed as follows:

$$Z(t) = X_{LOI} \cdot \sin\omega_m t(\pm) X_{LOQ} \cdot \cos\omega_m t \text{ for } A=1 \quad (6a)$$

$$Z(t) = -\sin(\omega_c \overline{(+)} \omega_m)t - \frac{1}{3}\cos(3\omega_c(\overset{+}{-})\omega_m)t - \quad (6b)$$
$$\frac{1}{5}\sin(5\omega_c \overline{(+)} \omega_m)t - \frac{1}{7}\sin(7\omega_c(\overset{+}{-})\omega_m)t$$

In order to derive the equations 5 and 6 the following addition theorems are used:

$$\cos\alpha\cos\beta = \frac{1}{2}[\cos(\alpha-\beta) + \cos(\alpha+\beta)] \quad (7a)$$

$$\sin\alpha\sin\beta = \frac{1}{2}[\cos(\alpha-\beta) - \cos(\alpha+\beta)] \quad (7b)$$

$$\sin\alpha\cos\beta = \frac{1}{2}[\sin(\alpha-\beta) + \sin(\alpha+\beta)] \quad (7c)$$

A combination of the two described quadrature modulators for generating the first and the second transmission signal Y, Z is known, for example, from the Japanese document P 6-120990 A.

As appears from the Fourier series representation for the uncompensated transmission signals Y and Z, these signals contain not only the fundamental wave, represented by $\cos(\omega_c-/+\omega_m)\cdot t$ or $-\sin(\omega_c-/+\omega_m)\cdot t$ but also a number of harmonics that are represented by the high frequency oscillation components and each of which represents an undesirable component in the required transmission modulation spectrum. The described harmonics in the uncompensated transmission signal at the output of a quadrature modulator are undesirable because, when input into a non-linear amplifier stage succeeding the quadrature modulator, they would cause new mixed products whose frequency would be in the vicinity of the fundamental frequency of the transmitted signal; the required transmission modulation spectrum would thus be disturbed.

Customarily the harmonics in the uncompensated transmission signal at the output of a quadrature modulator are removed by means of a downstream low-pass filter. The construction of such a low-pass filter, however, is comparatively complex, because additionally a high signal-to-noise ratio is required in the transmitters. Therefore, integration of a quadrature modulator and a subsequent low-pass filter together on one chip cannot be realized thus far. The Philips component OM5175 is an example of an integrated quadrature modulator that must be externally succeeded by a low-pass filter.

A feasible solution for eliminating the harmonic components in the transmission signal would consist in using exclusively ideal multipliers in the quadrature modulator and in prefiltering the oscillation signals $X_{LOI}$ and $X_{LOQ}$ in such a manner that they contain exclusively their fundamental waves, that is, $\cos(\omega_c t)$ or $\sin(\omega_c t)$ (see the equations 3 and 4). Such an approach to a solution, however, will not be the subject of the present invention, because such a proposal would only shift the filter problem to other locations and, moreover, would also impose the necessity of ideal multipliers.

On the basis of the described state of the art it is an object of the present invention to improve a transmitter and a method for generating a transmission signal of the kind set forth in such a manner that the expenditure for subsequent filtering of the transmission signal is reduced.

This object is achieved by a transmitter for generating a transmission signal, which transmitter includes; a modulation device for generating at least two uncompensated transmission signals (Y, Z) by modulation of a baseband signal with a respective, oscillation signal, each of said two uncompensated transmission signals (Y, Z) including at least one interference component and the interference components in the two uncompensated transmission signals being phase shifted relative to one another by a given amount, wherein the transmitter includes an all-pass which succeeds the modulation device in order to generate an output signal by shifting the phase of the interference component in one of the two uncompensated transmission signals in such a manner that the interference component in the output signal of the all-pass has been phase shifted 0° or 180° relative to the interference component in the other one of the two uncompensated transmission signals, and also includes a combination device for generating an at least partly compensated transmission signal by mathematical combination of the output signal of the all-pass and the other uncompensated transmission signal in such a manner that their respective interference components, phase shifted 0° or 180° relative to one another, are compensated in the at least partly compensated transmission signal.

The other one of the two uncompensated transmission signals is the transmission signal that is not subjected to a phase shift by the all-pass.

The partial compensation claimed in claim 1 compensates at least individual, undesirable interference components in the transmission signal present at the output of the combination device, that is, eliminates these components at least to a high degree. Subsequent filtering can usually be dispensed with for the compensated interference components.

However, despite the compensation the transmission signal at the output of the combination device may still include undesirable interference components that were not eliminated by the compensation; therefore, it is referred to as an at least partly compensated transmission signal.

Because of the described at least partial compensation of interference components, the expenditure for a subsequent low-pass filtering of the at least partly compensated transmission signal, aimed at achieving a maximum elimination of all interference components, is strongly reduced. Such a simplification, advantageously enables integration on one chip of the low-pass filter required for the subsequent low-pass filtering, together with the transmitter that includes the modulation device, the all-pass and the combination device.

In conformity with a first embodiment the one interference component that is compensated in the transmitter according to the invention is preferably the third harmonic in the uncompensated transmission signals. This is particularly advantageous because the frequency of the third harmonic is near the fundamental frequency of the transmission signal. Compensation of the third harmonic allows for a significantly simpler construction of the low-pass filter succeeding the combination device.

When only one all-pass is used for shifting the phase of the interference component in only one of the two uncompensated transmission signals, it is advantageous to subject the other uncompensated transmission signal that has not been phase shifted to low-pass filtering before applying it to the combination device. The low-pass filter corrects the phase and the gain factor of the interference component in the other uncompensated transmission signal in order to eliminate fluctuations of the gain factor and the phase of the output signal of the all-pass which are caused by tolerances in the hardware of the all-pass. The adaptation ensures that the interference components in the two transmission signals compensate one another as well as possible after their superposition.

As an alternative for the low-pass filter, the second uncompensated transmission signal may also be applied to a second all-pass which is preferably used for the compensation of the tolerances caused by the first all-pass. The second all-pass also serves to achieve as good as possible compensation at the output of the mathematical combination device.

Preferably, the transmitter also includes a downstream low-pass filter for filtering the at least partly compensated transmission signal in order to remove interference components that did not participate in the compensation from the transmission signal.

The transmitter can advantageously be integrated on a chip together with the low-pass filter for filtering the at least partly compensated transmission signal. Because of the at least partial compensation, the integration is also possible while satisfying necessary requirements in respect of a required signal-to-noise ratio.

The first and the second uncompensated transmission signal can be generated particularly simply by addition of the output signals of each time two quadrature modulators.

The object is also achieved as disclosed in the independent method claim 9.

The advantages of the method described therein correspond to the advantages mentioned above for the various embodiments of the transmitter.

Figure 1A:
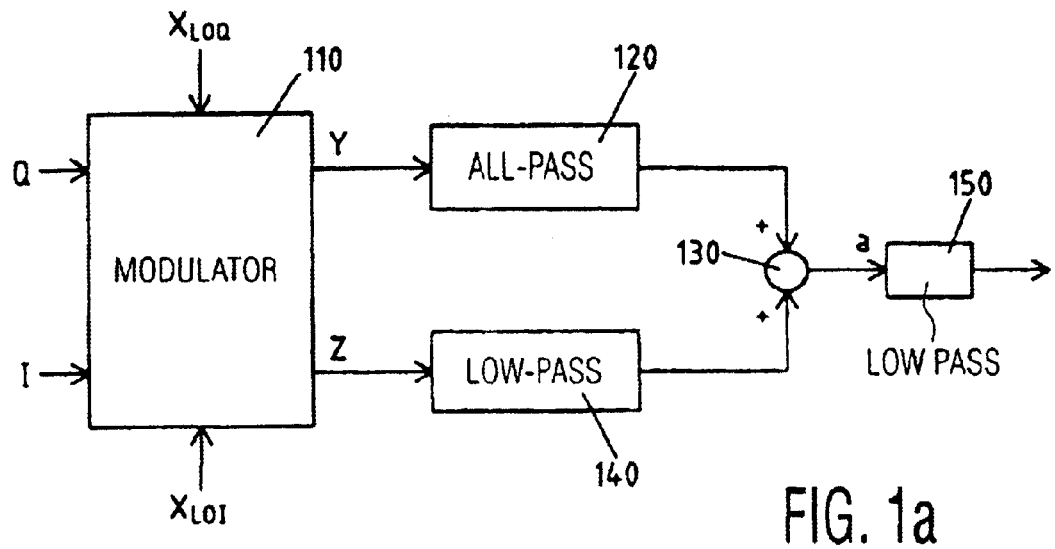
Figure 1B:
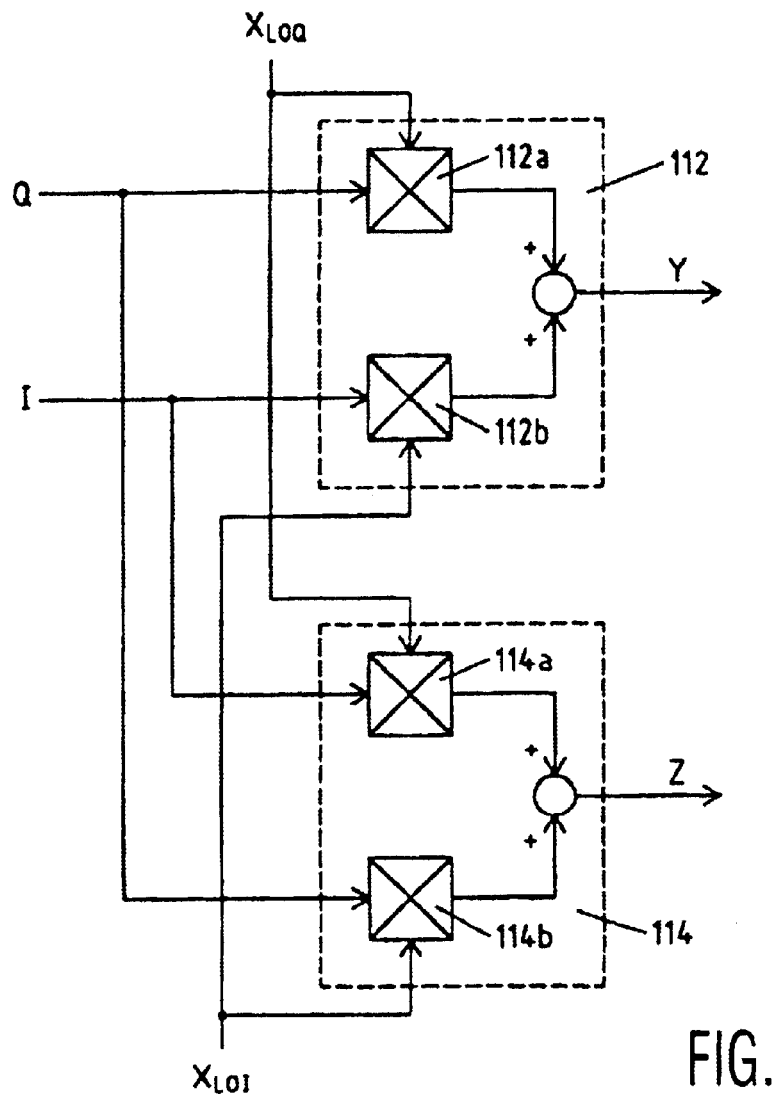
Figure 2:
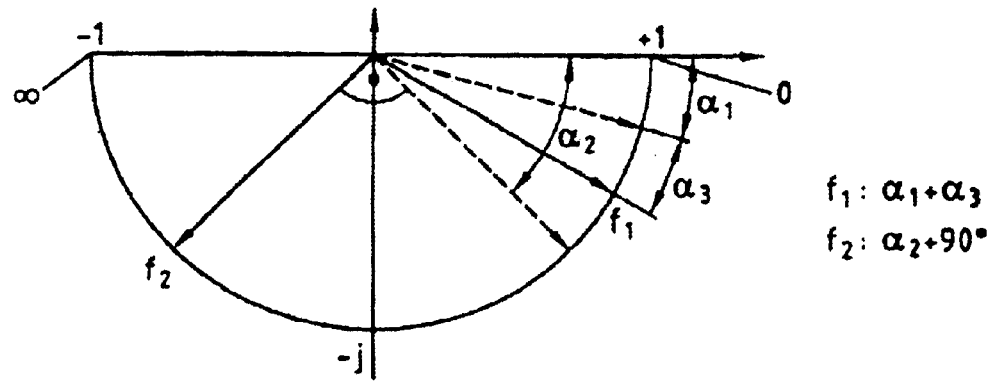
Figure 3A:
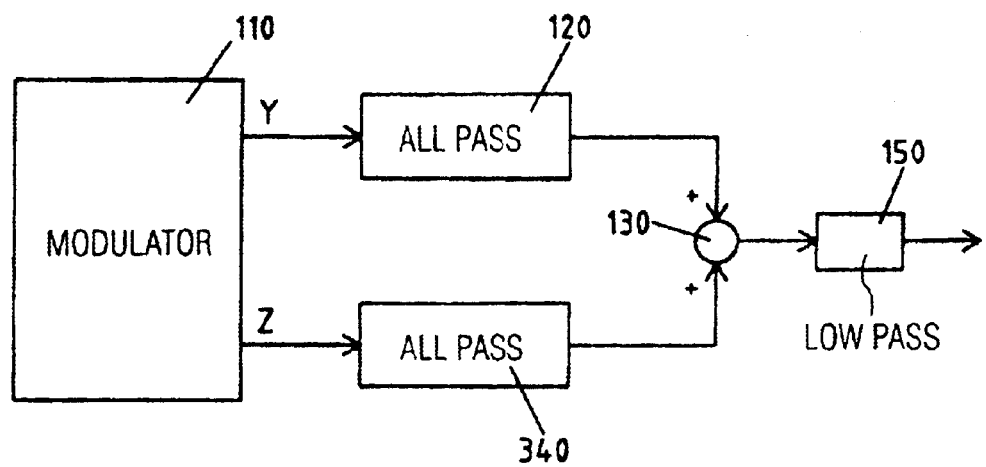
Figure 3B:
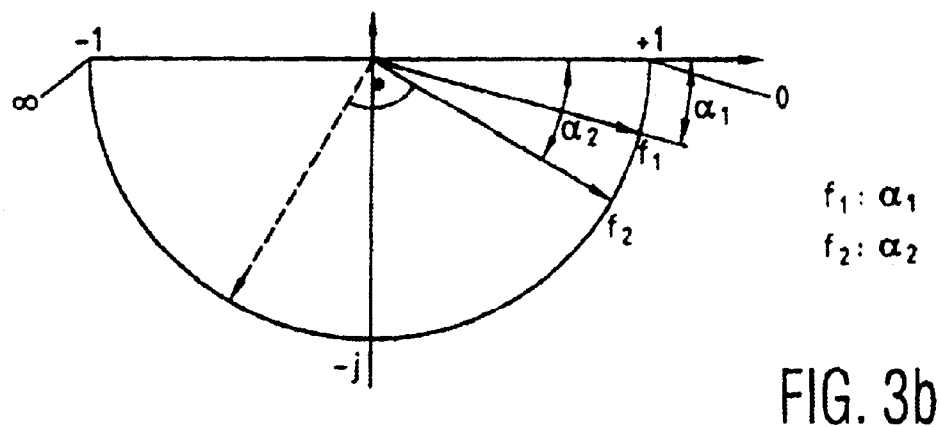
Figure 4:
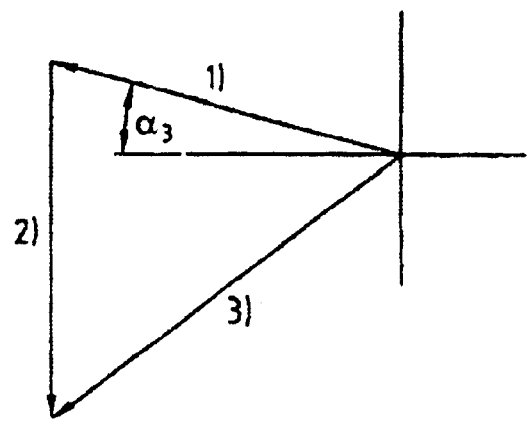
Figure 5A:
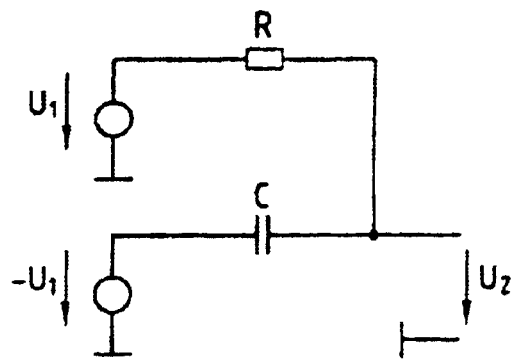

The invention will be described in detail hereinafter with reference to the FIGS. 1 to 9; therein FIG. 1*a* shows a first embodiment of a transmitter with downstream low-pass filter in accordance with the invention, FIG. 1*b* shows the construction of a modulation device of the transmitter shown in FIG. 1*a*, FIG. 2 shows a locus curve for a first all-pass in conformity with the first embodiment of the present invention, FIG. 3a shows a second embodiment of a transmitter in accordance with the invention, FIG. 3b shows a locus curve for a second all-pass of the second embodiment in accordance with the invention, FIG. 4 shows a vector diagram for an at least partly compensated transmission signal in conformity with the second embodiment in accordance with the invention, FIG. 5a shows an example of the known construction of a first-order all-pass.

Figure 5B:
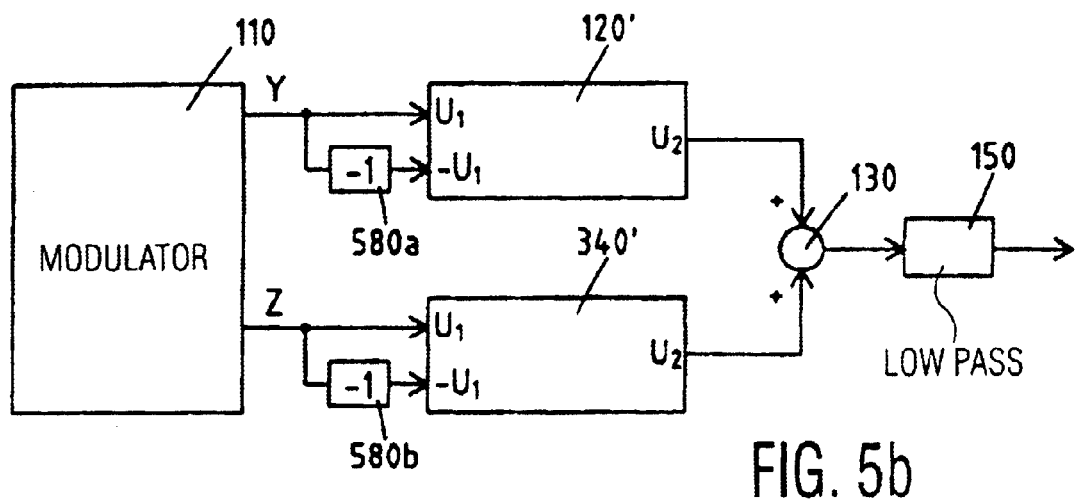

FIG. 5b shows the integration of all-passes in conformity with FIG. 5a in the transmitter shown in FIG. 3a, FIG. 6 shows a first example of a quadrature modulator according to the present state of the art, FIG. 7 shows a vector diagram for the baseband signals I and Q, FIG. 8 shows the oscillation signals $X_{LOI}$, $X_{LOQ}$, and FIG. 9 shows a second example of a quadrature modulator in accordance with the present state of the art.

Preferred embodiments of the invention will be described in detail hereinafter with reference to the FIGS. 1 to 5.

FIG. 1a shows a first embodiment of a transmitter according to the present invention. The transmitter includes a modulation device 110 for generating two uncompensated transmission signals Y(t), Z(t).

In the modulation device 110 shown in FIG. 1b the uncompensated transmission signals Y, Z are formed each time as output signals of a first and a second quadrature modulator 112, 114 whose operation has been described above with reference to FIG. 9. The uncompensated transmission signals Y, Z are phase shifted relative to one another by a given amount, being 90° in the first embodiment shown in FIG. 1a.

For effective compensation of undesirable interference components in the signals Y, Z it is necessary to shift only the phase of the interference components in the transmission signals by a further 90° relative to one another, so that subsequently they exhibit an overall phase difference of 0° or 180°. In this respect it is important that the useful components, that is, notably the fundamental waves, in the signals Y, Z are not phase shifted at all, if possible, or at least not shifted so much that they are eliminated by the subsequent compensation.

For the compensation of the interference components the uncompensated transmission signal Y is applied to a first all-pass 120 in conformity with FIG. 1a; this all-pass shifts the phase of at least one or possibly more interference components present by the necessary 90°, but not that of the useful component in the one uncompensated transmission signal Y.

As an alternative to the example shown in FIG. 1a it would also be possible to apply the signal Z to the all-pass 120 instead of the signal Y. It would also be possible to apply both signals Y and Z to a respective all-pass. In each case, however, it must be ensured that after the processing of the signals Y and/or Z at least a part of their respective interference components exhibits a phase difference of 0° or 180° relative to one another.

A combination device 130 mathematically combines the output signal of the first all-pass with the other uncompensated transmission signal whose phase has not been shifted by the all-pass, that is, after low-pass filtering of the other uncompensated transmission signal by a first low-pass 140.

The first low-pass 140 provides adaptation of the phase of the interference component in the other uncompensated transmission signal Z whose counterpart in the uncompensated transmission signal Y (that is, both interference components concern, for example the same third harmonic) is phase shifted by the first all-pass 120 so that the phase difference between the two interference components amounts to exactly 0° or 180°; in other words, the low-pass eliminates inaccuracies that occur in the output signal of the first all-pass during the phase shift of the interference component because of structural tolerances in the all-pass. Moreover, the first low-pass 140 provides correction of the gain factor of the other uncompensated transmission signal Z in such a manner that the amplification of its interference component, corresponding to the gain factor of the corresponding interference component at the output of the all-pass, is normalized to 1.

When the phase difference of the interference components considered at the output of the first all-pass 120 and at the output of the first low-pass 140 have been phase shifted 0° relative to one another and normalized to the same gain factor, the combination device 130 operates as a subtraction device. In another case, when the phase difference between the two interference components amounts to 180°, the device 130 acts as an adding device. In both cases it generates at its output the at least partly compensated transmission signal in which notably the interference component shifted by the first all-pass 120 is no longer present. The combination device 130 is succeeded by a second low-pass filter 150 which serves to remove further interference components that are still present in the at least partly compensated transmission signal and have not been eliminated by the compensation.

Preferably, the first all-pass 120 is constructed in such a manner that it shifts the phase of those interference components in the uncompensated transmission signal Y, and hence makes these components suitable for compensation, whose elimination can be realized with great difficulty only by pure downstream low-pass filtering. This holds notably for interference components whose frequency is near the frequency of the desired fundamental wave of the transmission signal. When use is made of binary oscillation signals, this holds again notably for the third harmonic of the uncompensated transmission signal Y. When the third harmonic was eliminated from the at least partly compensated transmission signal by compensation at the output of the combination device, the largest interference component in the transmission signal that is also most difficult to remove has already been eliminated. The interference components still present in the transmission signal at the output of the combination device after the compensation can subsequently be readily removed by the second low-pass of simple construction. The construction of the second low-pass is then so simple that it is also suitable for integration on a chip together with the transmitter.

FIG. 2 shows a locus curve for the first all-pass 120 in conformity with the described first embodiment of the invention and in conformity with a second embodiment of the invention that is yet to be described in detail hereinafter.

The phase positions of the fundamental wave and the third harmonic of the uncompensated transmission signal Y at the input of the first all-pass 120 are represented by the respective dashed arrows with the angles $\alpha_1$ and $\alpha_2$ in the rendition of the locus curve. Furthermore, the phase positions of the fundamental wave and the third harmonic at the output of the first all-pass are represented by the vectors $f_1$ and $f_2$ shown in solid lines.

The main task of the first all-pass 120 is to shift the phase of the particularly disturbing third harmonic in the first uncompensated transmission signal Y by 90°. This phase shift is carried out notably because, as described above, the phase difference between the third harmonic of the uncompensated transmission signal Y and the other uncompensated transmission signal Z at the output of the modulation device already amounts to 90°. The additional phase shift of the component of the third harmonic in the uncompensated transmission signal Y by the first all-pass 120 theoretically results in a phase difference of 180° between the third harmonic of the signal at the output of the first all-pass and the other uncompensated transmission signal Z.

As has already been described, a subsequent mathematical combination of the two signals in the combination device 130 provides compensation of the third harmonic in the resultant signal at the output of the combination device 130.

When a non-ideal first all-pass 120 is used, the phase shift cannot be limited to exclusively the interference component of the third harmonic; instead, the phase of other components of the uncompensated first transmission signal Y is also shifted. This is illustrated for the fundamental wave $f_1$ in the locus curve of FIG. 2; this wave is shifted through the angle $\alpha_3$ to $f_1$ with respect to its phase position at the input of the first all-pass, that is represented by the angle $\alpha_1$. Correction of the phase position of the fundamental wave of the other uncompensated transmission signal Z is necessary in order to ensure that such a phase shift of the fundamental wave of the transmission signal, unfortunately being inevitable when use is made of real all-passes, does not have undesirable consequences in the form of a compensation of the fundamental wave of the transmission signal at the output of the combination device 130. This correction is ensured by the described low-pass 140.

In conformity with a second embodiment of the invention, as shown in FIG. 3a, a second all-pass 340 may also be provided instead of the low-pass. The second all-pass also serves to compensate the tolerances of the first all-pass 120. In this context tolerances are to be understood to mean notably resistance and capacitance tolerances of the first all-pass which may cause a change of the absolute position of the vector $f_2$ for the first fundamental wave on the locus curve.

FIG. 3b shows a locus curve for the second all-pass 340 which is suitable for compensation of the tolerances of the first all-pass 120, notably in that it matches the phase position of the fundamental wave (vector $f_1$ in FIG. 3b) of the other uncompensated transmission signal at its output with the phase position of the fundamental wave (dashed vector $\alpha_1$ in FIG. 2) of the uncompensated signal Y(t) at the input of the first all-pass 120.

The second all-pass also ensures that the gain factor, that is, the length of the vector, is always normalized to 1 in the all-passes.

FIG. 4 shows a vector diagram of the useful signals, that is, of the fundamental wave components of the signals at the output of the two all-passes 120, 340 as well as at the output of the combination device 130, in conformity with the second embodiment of the invention. It appears that, due to the use of the non-ideal first all-pass 120, the fundamental wave (see vector 1) of the first uncompensated transmission signal Y was shifted, through the angle $-\alpha_3$ with respect to its phase position of 180° at the input of the first all-pass 120. As a result of the use of the second all-pass, the phase shift of the fundamental wave of the uncompensated transmission signal Z is stabilized to a phase difference of 90° (see vector 2) relative to the phase position ($-180°$) of the fundamental wave of the first uncompensated transmission signal Y at the input of the all-pass. It is clearly shown in FIG. 4 that, for as long as the angle $\alpha_3$ remains small, the fundamental wave of the partly compensated transmission signal (see vector 3) at the output of the combination device 130 essentially is not affected by the compensation and, therefore, is still contained in the partly compensated transmission signal as before and as desired.

FIG. 5a shows an example of a known first-order all-pass. It includes a first branch which consists of a first voltage source $U_1$ and a resistor R, and a second branch which consists of a second voltage source $-U_1$ of opposite polarity relative to the first voltage source, and a capacitor C. The two branches are connected in parallel in such a manner that the free ends of the resistor and the capacitor, that is, the ends which are not connected to the first or the second voltage source, are combined and constitute the output of the all-pass wherefrom the output voltage $U_2$ is derived.

The transfer function of this known all-pass is as follows:

$$\frac{U_2(s)}{U_1(s)} = \frac{1-sRC}{1+sRC} \tag{8}$$

The gain factor of such an all-pass amounts to 1 and the phase shift between $U_2$ and $U_1$ induced thereby amounts to:

$$\alpha = -2 \arctan \frac{\omega}{\omega_E}; \text{ with } \omega_E = \frac{1}{RC} \tag{9}$$

When use is made of a non-ideal all-pass, the quantity $\omega_E$ varies due to tolerances of the resistor R and the capacitor C. Consequently, the phase shift induced by the all-pass is also subject to a fluctuation $\Delta\alpha$ that can be calculated as follows:

$$\Delta\alpha = 2 \arctan\frac{\omega}{\omega_{E \min}} - 2 \arctan \frac{\omega}{\omega_{E \max}}; \text{ calculated for} \tag{10}$$

$$\omega = 2\pi f_2$$

FIG. 5b shows the use of all-passes as shown in FIG. 5a for a transmitter in conformity with a second embodiment of the invention. When these all-passes are used, according to FIG. 5b it is necessary to provide the uncompensated transmission signals Y, Z each time also in inverted form for the second inputs $-U_1$ of the first and second all-pass 120' and 340'. This is realized by means of the inverters 580a and 580b.

What is claimed is:

1. A transmitter for generating a transmission signal, which transmitter includes: a modulation device (110) for generating at least two uncompensated transmission signals (Y, Z) by modulation of a baseband signal with a respective oscillation signal, each of said two uncompensated transmission signals (Y, Z) comprising at least one interference component and the interference components in the two uncompensated transmission signals being phase shifted relative to one another by a given amount, characterized in that the transmitter includes an all-pass (120) coupled to the modulation device (110) in order to generate an output signal by shifting the phase of the interference component in one of the two uncompensated transmission signals in such a manner that the interference component in the output signal of the all-pass has been phase shifted 0° or 180° relative to the interference component in the other one of the two uncompensated transmission signals, and also includes a combination device (130) for generating an at least partly compensated transmission signal by mathematical combination of the output signal of the all-pass (120) and the other uncompensated transmission signal in such a manner that their respective interference components, phase shifted 0° or 180° relative to one another, are compensated in the at least partly compensated transmission signal.

2. A transmitter as claimed in claim 1, characterized in that the respective interference components in the two uncompensated transmission signals correspond to their third harmonic.

3. A transmitter as claimed in claim 1, further comprising a low-pass (140) for filtering the other uncompensated transmission signal providing said filtered signal to the combination device (130).

4. A transmitter as claimed in claim 1, further comprising a further all-pass (340) for filtering the other uncompensated transmission signal providing said filtered signal to the combination device (130).

5. A method of generating a transmission signal, which method includes the following steps:

generating at least two uncompensated transmission signals, each of which includes at least one interference component, the respective interference components in the two transmission signals being phase shifted by a given amount relative to one another, wherein the phase of the interference component in one of the two uncompensated transmission signals (Y, Z) is shifted in such a manner that the amount of the phase difference between the interference components in the two uncompensated transmission signals amounts to 0° or 180° after the phase shift, adding the one of the two uncompensated transmission signals whose interference component has been phase shifted and the other uncompensated transmission signal when their respective interference components are of opposite phase and subtracting the one of the two uncompensated transmission signals whose interference component has been phase shifted and the other uncompensated transmission from one another when their respective interference components are of the same phase, thus yielding an at least partly compensated transmission signal.

* * * * *